Figure 1:
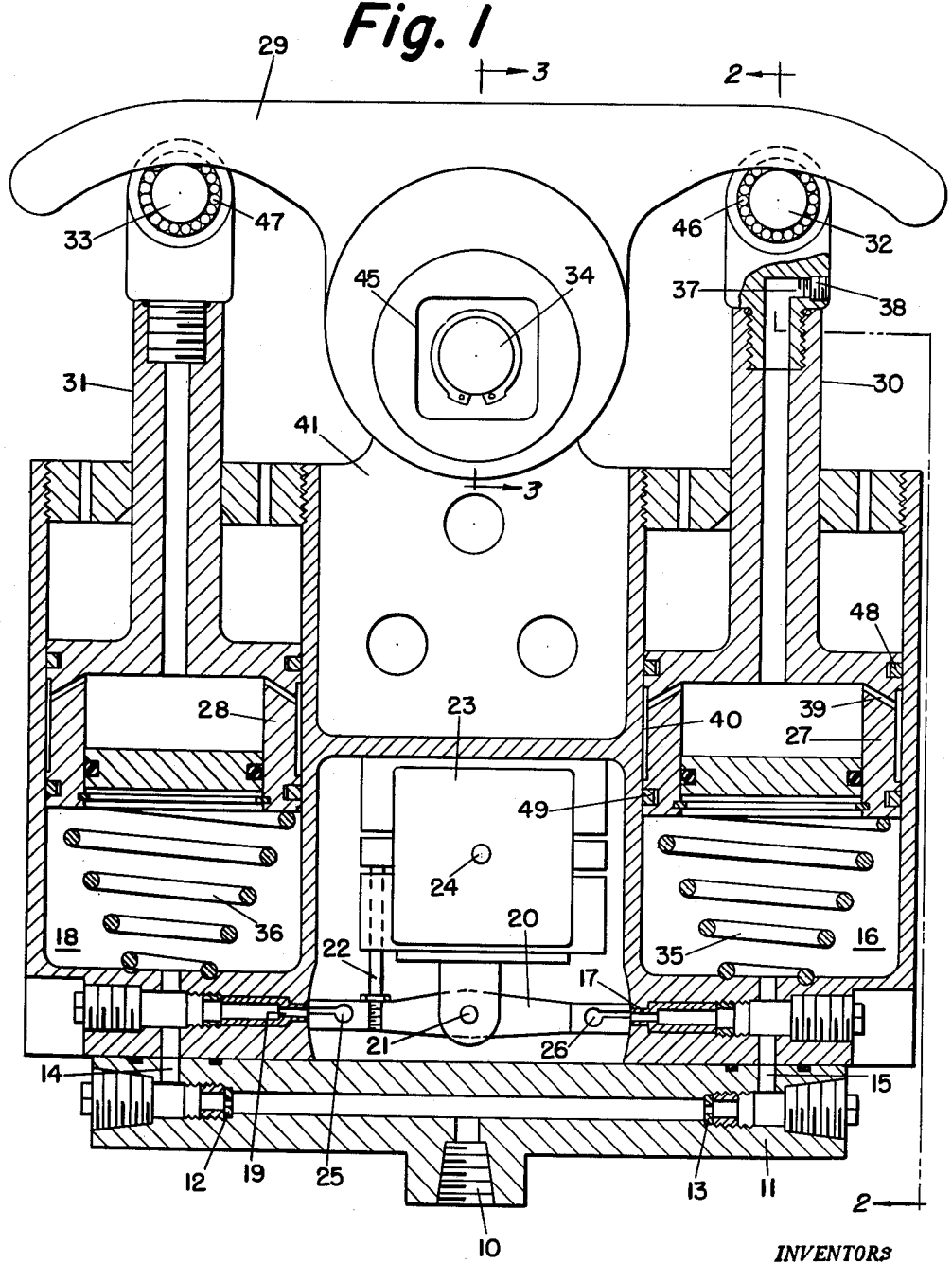

Feb. 13, 1962  M. WEINSTOCK ETAL  3,020,885
ROTARY SERVO VALVE CONTROLLED MECHANISM
Filed Sept. 1, 1961  2 Sheets-Sheet 1

INVENTORS
MANUEL WEINSTOCK
RAYMOND C. SUTTER
BY
S. J. Rotondi, A. J. Dupont & S. Dubroff
ATTORNEY Feb. 13, 1962 M. WEINSTOCK ETAL 3,020,885
ROTARY SERVO VALVE CONTROLLED MECHANISM
Filed Sept. 1, 1961 2 Sheets-Sheet 2
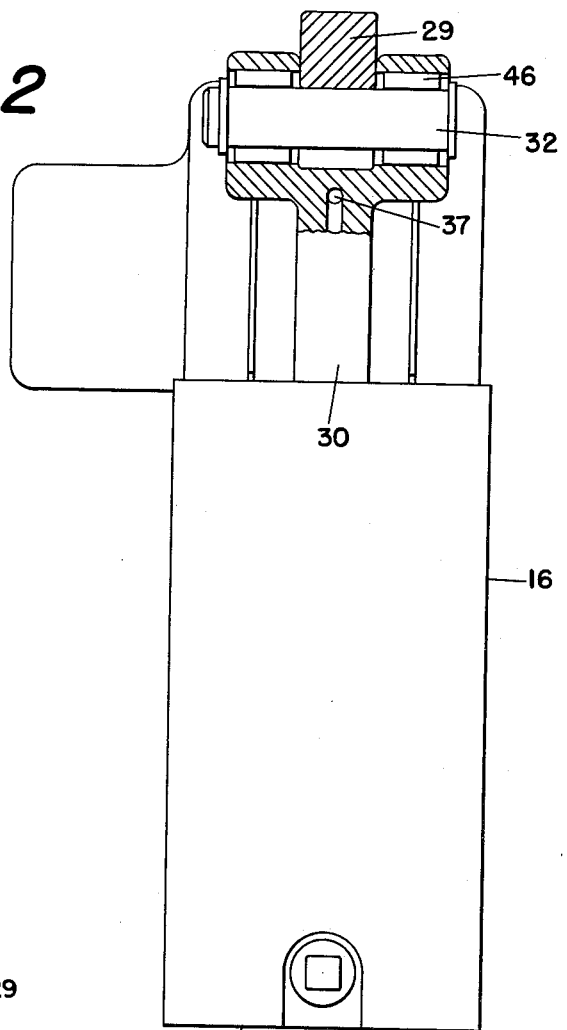
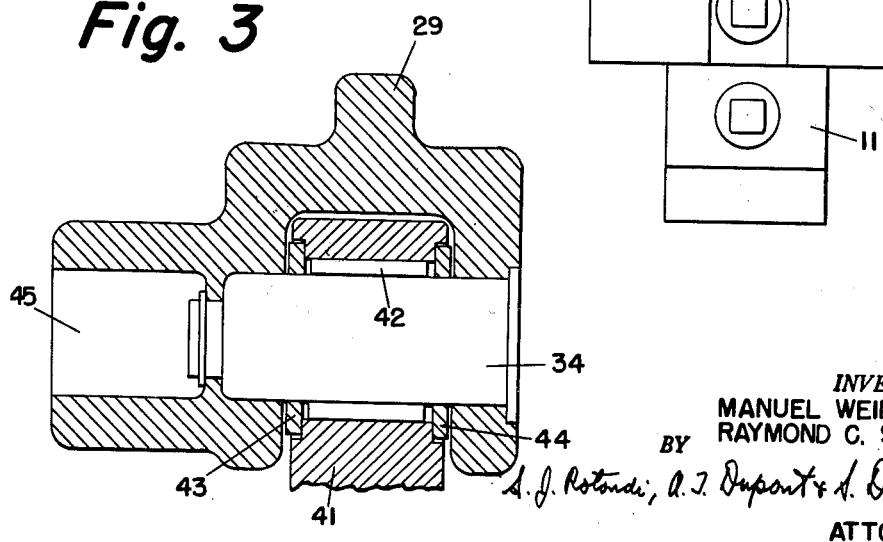
INVENTORS
MANUEL WEINSTOCK
RAYMOND C. SUTTER
ATTORNEY

United States Patent Office 3,020,885
Patented Feb. 13, 1962

3,020,885
ROTARY SERVO VALVE CONTROLLED MECHANISM
Manuel Weinstock and Raymond C. Sutter, Philadelphia, Pa., assignors to the United States of America as represented by the Secretary of the Army
Filed Sept. 1, 1961, Ser. No. 136,407
4 Claims. (Cl. 121—38)
(Granted under Title 35, U.S. Code (1952), sec. 266)

The invention described herein may be manufactured and used by or for the Government for governmental purposes without the payment to us of any royalty thereon.

This invention relates to mechanisms which are operated by a fluid pressure, and more particularly to a fluid pressure operated mechanism which is controlled by a servo-valve motivated in accordance with a command signal such as that derived from the steering control apparatus of a missile or the like.

Presently available is a fin positioning mechanism wherein a pair of motor chambers have pistons associated with means for positioning the fin, are connected through separate metering orifices to a source of fluid pressure, and have opposed output ports between which a flapper is positioned by a command signal. This positioning of the flapper functions in a well known way to vary the effective areas of the ports and change the fluid pressures in the motor chambers so that the fin is positioned in accordance with the command signal.

This prior art mechanism leaves something to be desired with respect to (1) the force involved in the operation of the servo-valve, (2) the clogging of the output ports by particles carried in the working fluid, and (3) its frequency response characteristics.

The present invention minimizes these and other difficulties by the provision of an improved mechanism wherein the pressures applied to the pistons are controlled by a rotary servo-valve, and the pistons are associated with a damping grease and are so coupled to the fin or load device that, throughout the full range of motion, the pressure angle is zero, the angular motion is directly proportional to the linear motion, and the torque-force relationship is constant.

The invention will be better understood from the following description when considered in connection with the accompanying drawings and its scope is indicated by the appended claims.

Referring to the drawings:
FIG. 1 is a longitudinal sectional view of the mechanism,
FIG. 2 is an end view with a partial section taken on the line 2—2 of FIG. 1, and
FIG. 3 is a section taken on line 3—3 of FIG. 1.

The mechanism illustrated by FIGS. 1 to 3 has an inlet 10 through which a high pressure fluid, such as propellant gas, air, nitrogen, etc., is supplied to a manifold 11. This working gas flows through the manifold to two up stream metering orifices 12 and 13 and thence through the passageways 14 and 15. From the passageway 15, the gas flows into a cylinder 16 and to a downstream or control orifice 17. Similarly from the passageway 14, the gas flows into a cylinder 18 and to a downstream or control orifice 19.

The downstream orifices 17 and 19 are of a rectangular shape. Cooperating with them is a rotary valve member or rotor 20 which is pivoted about a shaft 21 and is coupled through a rod 22 to a torque motor 23 which has a very limited rotational movement about a shaft 24. Applied to the torque motor 23 through electrical leads (not shown) is a command signal whereby the rotary valve member 20 is positioned and the effective areas of the downstream orifices 17 and 19 are varied in accordance with the command signal. Connected with the orifices 17 and 19 are outlet ports 25 and 26 through which working gas bypassed by these orifices is discharged. As hereinafter explained the pressure applied to the pistons 27 and 28 which move in the cylinders 16 and 18 is determined by the effective areas of the downstream orifices 17 and 19 and these effective areas are varied in accordance with the command signal applied to the torque motor 23.

The pistons 27 and 28 are coupled to a rocker arm 29 through rods 30 and 31 and rollers 32 and 33. The rocker arm 29 is rotatable about a shaft 34 to which is fixed a missile fin or other load device.

Before the torque motor 23 is actuated, the pistons 27 and 28 are restrained from idle motion by the restraining springs 35 and 36. These springs function to keep the rollers 32 and 33 in contact with the output torque arm 29. Both springs exert the same force so that arm 29 is maintained in its midposition when the mechanism is not in operation. In operation, the effect of the springs 35 and 36 on the piston motion is negligible and the gas pressure in the cylinders 16 and 18 keeps the rollers 32 and 33 in constant contact with the output torque arm 29. The rollers 32 and 33 are supported in needle bearings which are housed in the clevised ends of the rods 30 and 31.

The piston 27 and rod 30 are hollowed to form a chamber which communicates with an opening 37 through which a damping grease is introduced into the chamber. The opening 37 is closed by a threaded plug 38. The grease is extruded through a passageway 39 into the undercut or recessed portion 40 of the piston and functions to dampen out any oscillations that might otherwise be introduced into the motion of the output torque arm 29. The pin 34 supporting the output torque arm is housed in a needle bearing 42 (see FIG. 3) seated in the mechanism body 41 and mounted with thrust washers 43 and 44 at its opposite ends. A square hole 45 in one side of the arm 29 receives the shaft of a control fin or other load device to be operated by the mechanism.

The pistons 27 and 28 are of identical construction. The rollers 32 and 33 are supported in needle bearings 46 and 47 which are housed in the clevised ends of the rods 30 and 31. As the position of the arm 29 changes during operation of the mechanism, the centers of the rollers 32 and 33 followed an involute curve. The use of two single acting pistons in combination with a symmetrical involute-cam rocker arm, such as the arm 29, to form the mechanism output has many advantages.

Among these advantages are zero pressure angle, direct proportionality between linear and angular motion and constant torque-force relationship, all these advantages being realized throughout the full range of motion. Thus the point of contact on the cam surface of the arm 29 is always in line with the axis along which the force is applied so that there is no side loading on the piston, friction is reduced, and the seals 48 and 49 wear evenly. As utilized in a closed loop control system, the direct proportionality between angular and linear motion allows a simple rectilinear transducer to be attached to piston rod 30 or 31 to feed back the rotational position of the rocker arm. The constant torque-force relationship has the advantage that the torque available to overcome inertia is the same at every part of the stroke.

The downstream orifices 17 and 19 are of rectangular form. The ends of the servo-valve rotor 20 also have rectangular slits which are offset from the orifices in the housing 41 and act to determine the effective area of the downstream orifices 17 and 19.

In the illustrated position of the servo-valve rotor 20, there is equal flow of working gas through the downstream orifices 17 and 18 and the forces exerted on the rocker arm 29 are balanced. When the rotor 10 is positioned to cover more of one downstream orifice and expose more of the other, the result is an adjustment of the position of the arm 29 to conform to the position of the rotor 20. When the mechanism is utilized in connection with a missile, the desired control fin position is fed to the torque motor 23 as a command current. This current produces a deflection of the rotor 20. As a result of the relatively high torque motor force output, in comparison with the low servo-valve rotor inertia and the small rotor displacement required, the change in the rotor position is substantially instantaneous as compared with the response of the control fin.

The displaced rotor alters the effective areas of the downstream orifices 17 and 19, always increasing one while decreasing the other. This type of operation is often referred to as a push-pull control since both control orifices 17 and 19 are corrected simultaneously to achieve a desired result. Since the upstream orifices 12 and 13 meter a fixed and equal quantity of gas to each side of the mechanism, the result of the adjustment in the area of the downstream or control orifices 17 and 19 is to build up pressure in the cylinder where the control orifice has been restricted and to reduce pressure in the other cylinder. This pressure difference between the two cylinders produces a displacement of the arm 29 from its midposition to the new position determined by the command signal.

As can be appreciated by those skilled in the art, an important advantage of the present invention is the reduction in the force required to operate the servovalve. This results from the fact that the flow of the exhaust gases from the control orifices is so directed that the forces exerted by these gases on the rotor 20 to not have to be overcome in order to adjust the rotor position. This permits the use of a smaller torque motor thereby reducing the bulk and weight of the equipment. Other advantages are that (1) the location and structure of the rotor 20 are such as to keep hot gases away from the torque motor, (2) larger or smaller deflections may be realized with the same torque motor by adjusting the lever arm dimensions of the rotor, and (3) clogging is minimized by the sweeping motion of the rotor across the control orifices.

We claim:

1. In a mechanism to be operated by a command signal, the combination of an output torque arm pivoted at its midpoint, a pair of cylinders, a pair of pistons each movable in a different one of said cylinders and each having a rod extending therefrom, a pair of rollers each rotatable in the end of a different one of said rods and each biased into contact with a different end of said arm, an inlet for admitting a gas under pressure, a pair of control orifices, a pair of metering orifices each connecting said inlet with a different one of said cylinders and control orifices, a rotor for controlling the effective areas of said control orifices, and means for positioning said rotor in accordance with a command signal whereby said output torque arm is positioned in accordance with said signal.

2. A mechanism according to claim 1 wherein each of said pistons has an external peripheral recess and wherein each piston forms with its rod an internal damping gas chamber communicating with its external recess.

3. A mechanism according to claim 1 wherein the parts of the torque output arm contacted by said rollers are in the form of an involute cam.

4. A mechanism according to claim 1 wherein said rollers are biased into contact with the ends of said arm by springs extending between said pistons and the rear ends of said cylinder.

References Cited in the file of this patent

UNITED STATES PATENTS

| | | |
|---|---|---|
| 1,309,257 | Martens | July 8, 1919 |
| 1,654,378 | Marchetti | Dec. 27, 1927 |
| 1,755,595 | Craig | Apr. 22, 1930 |
| 2,643,677 | MacLean | June 30, 1953 |